United States Patent [19]

Prydtz et al.

[11] Patent Number: 5,325,972
[45] Date of Patent: Jul. 5, 1994

[54] METHOD OF CONTROLLING SORTING SYSTEMS, AND A SORTING SYSTEM THUS CONTROLLED

[75] Inventors: Ole Prydtz, Hjortshoej; Ralph Kofoed, Hornslet, both of Denmark

[73] Assignee: Kosan Crisplant A/S, Aarhus, Denmark

[21] Appl. No.: 752,665

[22] PCT Filed: Feb. 20, 1990

[86] PCT No.: PCT/DK90/00048
§ 371 Date: Aug. 26, 1991
§ 102(e) Date: Aug. 26, 1991

[87] PCT Pub. No.: WO90/09849
PCT Pub. Date: Sep. 7, 1990

[30] Foreign Application Priority Data

Feb. 24, 1989 [DK] Denmark .................. 0858/89

[51] Int. Cl.⁵ .............................. B07C 5/00
[52] U.S. Cl. .......................... 209/552; 209/583;
209/900; 198/349; 198/349.6
[58] Field of Search ............ 198/349, 349.6, 350,
198/365; 209/552, 569, 583, 698, 900, 912

[56] References Cited

U.S. PATENT DOCUMENTS

| | | | |
|---|---|---|---|
| 3,695,462 | 10/1972 | Sullivan | 198/350 X |
| 3,803,556 | 4/1974 | Duffy | 198/349 X |
| 3,880,298 | 4/1975 | Habegger et al. | 198/349 X |
| 4,106,636 | 8/1978 | Ouimet et al. | 198/350 |
| 4,854,439 | 8/1989 | Ueda | 198/350 |
| 4,921,087 | 5/1990 | Nakamura | 198/350 |

FOREIGN PATENT DOCUMENTS 3117116 12/1982 Fed. Rep. of Germany.

*Primary Examiner*—D. Glenn Dayoan
*Assistant Examiner*—Tuan N. Nguyen
*Attorney, Agent, or Firm*—Antonelli, Terry, Stout & Kraus

[57] ABSTRACT

A converyor sorting system wherein articles to be sorted are loaded on letter towable trays adapted to be moved past a plurality of unloading or receiving stations at which the articles are selectively unloaded. A control system is provided which includes a plurality of decentralized control units, with the control system being based upon the utilization of trays or the like having identification codes adapted to be detected in unloading stations so as to cause of actuation of the tilting off of the articles for the identified unloading station. Control units are provided to receive the load of the specific tray, the identity of which is detected by the loading of the tray.

2 Claims, 1 Drawing Sheet

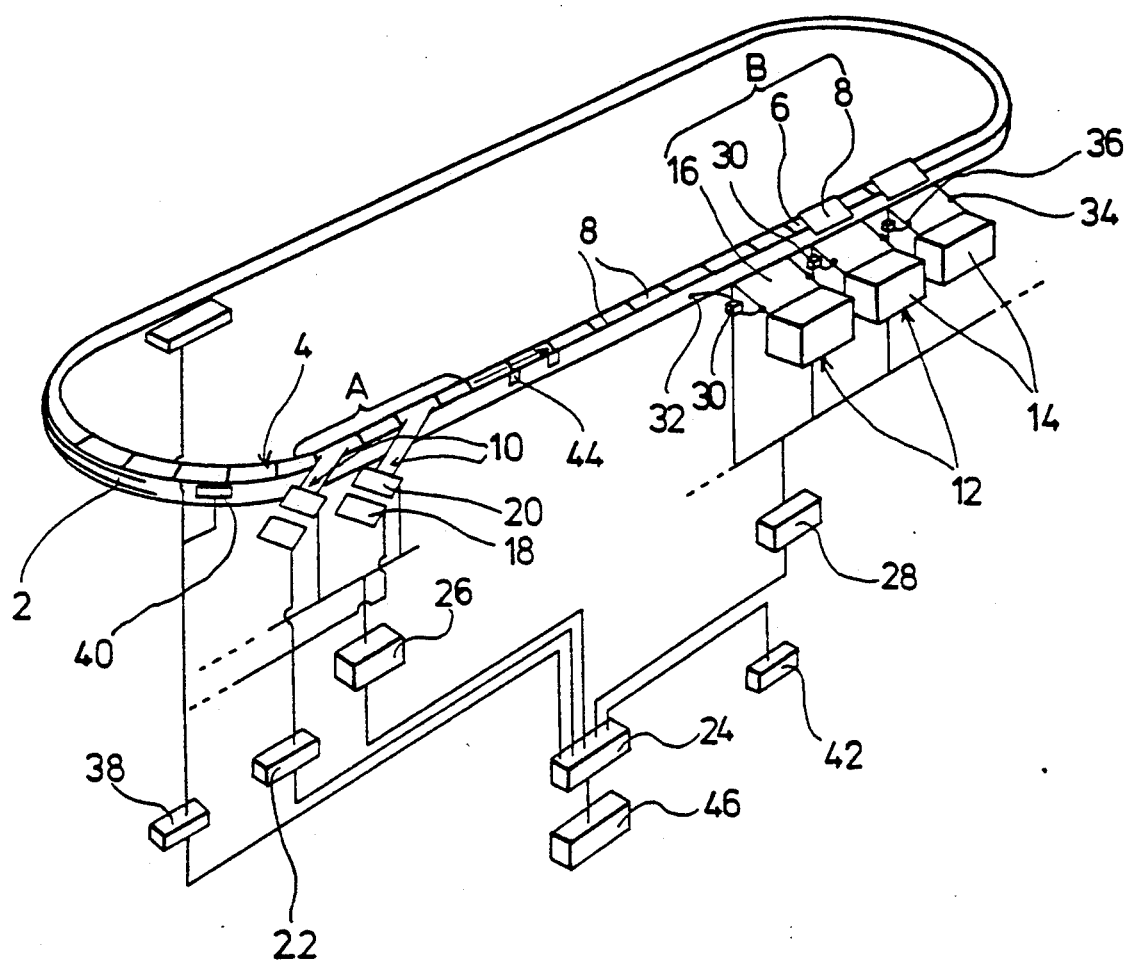

METHOD OF CONTROLLING SORTING SYSTEMS, AND A SORTING SYSTEM THUS CONTROLLED

The present invention relates to a method of controlling a sorting system and to a sorting system comprising a sorter conveyer having loading carrying trays or sections that can be loaded with articles, during movement of the conveyor, may be actuated to unload the articles in a selective manner to selected unloading or receiving stations, among a plurality of stations disposed along the moving or conveying path of the conveyor.

BACKGROUND OF THE INVENTION

Generally single conveyor sections or trays are laterally tiltedly arranged such that the unloading may be effected by a selected actuation of associating tilting mechanism for these trays; however, it has been proposed to effect an unloading operation by using stationary deflector means which, in selected unloading station, may be introduced into the moving path of the articles for guiding articles to that particular unloading station.

The unloading stations can be placed rather close to each other and each having an almost minimized dimension in the conveying direction, whereby it is important that the unloading operations be effected with high accuracy, i.e. during the movement of the relevant trays through relatively short, well defined lengths. The development has gone in the direction of a central control of these and many other functions in the system, because from a central control system is is possible to account for the location of all the trays, when the tray passages are detected at a single place only. Based on such detections a central control unit, which is informed of the destination code and of the time and place of loading of each article, will be able to actuate the unloading at just the selected unloading station, when only the conveyor itself is constructed with the required accuracy, here particularly with respect to a highly uniform pitch of the trays, such that each of the trays will be located just at the place that can be calculated based on the number of tray passages subsequent to the passage of each of the trays at the place of detection.

SUMMARY OF THE INVENTION

The invention is based on the recognition that considerable advantages are achievable by working with a decentralized control in connection with the use of local detectors for the passage of the trays at the single unloading stations, and thus the invention breaks with the general trend of development. It has already been realized that in large systems with highly developed controlling and supervising functions a limit area for the capacity of commercially available data processing equipment is being reached, and just the concerned sorter systems are very well suited to be subdivided into some different functional entities with coordinated, but otherwise individually controlled functions, such that a really extensive and effective controlling will be achievable in a system which, as a whole, will be relatively inexpensive.

As a first expression of a decentralized and simplified control, the invention proposes to make use of a detectable physical identification marking of the single tray sections of the conveyor, while at all loading and unloading stations detector means should be provided, capable of detecting these markings and being connected to a separate control unit that receives information of the destination codes of the articles and of the identity of the trays on which the articles have been loaded. Correspondingly this control unit may, in a selective manner, be operative to actuate the detector means of the single relevant unloading stations such that these detector means in any given unloading station will be programed to react on the occurrence of a tray unit having just the identification marking, which in connection with the data read-in is associated with the relevant destination code of the article. The sensor means at the unloading station may then be adapted to cause an actuation of the unloading means in just this unloading station, whereby this actuation can be effected as a result of a detected arrival of the tray to the relevant position, without any necessity of in the meantime keeping account of the location of all the other tray units.

This will imply not only a considerably reduced demand of computer capacity, but also the possibility of a simplified mechanical construction of the sorter system, because there will be no special tolerance requirements as to the pitch of the trays or the length of the single tray units. It will even be possible to make use of mutually separated tray units, inasfar as it will be unimportant whether the distance between these units is large or small; this implies particular advantages and possibilities, which, will become more apparent from the following description.

At the single receiving stations may be provided local control units that will not only react to the arrival of a designated tray unit, but also serve to control and check the operative events in connection with the single unloadings and the collecting of the unloaded articles, e.g. control of the reception by each unloading and a general control for avoiding overfilling of an associated collection container. All this may very well amount to quite many control and check functions for each single receiving station, and already as far as the wiring work is concerned a noticeable saving will be achieved when it is sufficient to establish local connections to the respective control units instead of many connections between a central data processor and all the single sensors and operations units. Already in fairly large systems this saving alone may amount to between a half and a million of Danish kroner.

BRIEF DESCRIPTION OF THE DRAWINGS

The above and other objects, features and advantages of the present invention will become more apparent when taken in connection with the accompanying drawings which show, for the purposes of illustration only, one embodiment in accordance with the present invention, wherein:

The single figure of the drawing of a schematic view of a sorter system constructing in accordance with the present invention.

DETAILED DESCRIPTION

The system of the present invention comprises a round-going sorter conveyor having a conveyor chassis 2 and, moving therealong, a row 4 of tray units 6 each provided with a laterally tiltable carrier tray 8. In a conventional manner the row 4 can be a coherent chain of units, but it is also possible to use separate cart units 6 or cart trains with several tray units, when suitable means for the driving thereof are provided. The row 4 passes a loading area A, in which one or more loading stations 10 are arranged, and thereafter an unloading area B that may stretch over practically all the remaining length of the conveyor. In the latter area is arranged a row of unloading or receiving stations 12, each comprising a collector container 14 and an inclined chute 16 leading down to its associated container 14. At each station 12 is provided a mechanism that can be actuated for effecting a lateral tilting of a passing tray 8 for unloading of the goods on the tray to the respective container 14.

At each loading station 10 a coding in unit 18 is provided, by which the successively arriving articles to be sorted are coded into the system with respect to their destinations, such that the articles can later be unloaded at the correct unloading stations 12, and at each loading station 10 there is also provided an inlet control unit 20 serving to control the delivery of the articles such that in a well defined manner the articles will be delivered to suitably empty trays. When more loading stations 10 are arranged in series it is of course required to make sure that the articles are delivered to a tray which has not already been loaded.

In the system according to the invention the coding units 18 are connected to a common processor or code master unit 22, adapted to supervise the principal correctness of the keyed or otherwise read destination data for successively supplied transport articles. Such a control may well be executed in a common control unit 22 without loading any superior processor control unit. However, common control the unit 22 is connected with such a superior processor sorter master 24 to which it transfers the checked destination data for the single supplied articles to be handled.

Correspondingly the inlet or loading control units 20 are connected with a common control unit or introduction master 26. While the single units 20 can supervise various functions with respect to a correct introduction of the articles, including reception of information as to the identity of the tray being loaded, the introduction master 26 should only be able to give the relevant loading orders and, thereafter, inform the sorter master 24 of the departure of the different trays after a successful loading thereof, which will enable the sorter master to transfer information of correlated tray numbers and destination codes to an unloading master 28 that will distribute the information to individual unloading control units 30. Via a sensor 32 in each unloading station, these units may be actuated by arrival of a tray unit 6,8 that has been destination coded for just the particular unloading station. Then the unit 30 may serve to control the tilting off of the article, e.g. also by checking the passage of the articles along the associated chute 16, e.g. by the article breaking a light beam between a lamp 34 and a photocell 36. The same photocell may be used for checking that the container 14 is not about to be overfilled. An alarm signal indicating an overfilling is fed or supplied to the unloading master 28 concurrently with being used for a blocking of the unloading tilting off function, but otherwise the master 28 will not need to be loaded by current control or check functions in the various unloading stations. As these stations may be spread over a large area this will imply that a lot of wiring can be saved, compared with the heavy wiring otherwise necessary between a central control unit and all the detailed sensors and actuators in all of the unloading stations.

A further master or machine condition master 38 coupled to the sorter master 24 and is connected with different relevant sensors for the condition of the moved system, e.g. a sensor 40 checking that all trays 8 are tilted back to a horizontal position before they reenter the loading zone A. Correspondingly the employed driving system may be controlled and checked via a separate master 42

In front of the sorter master 24 is arranged a managing master 46 that can be used for more superior functions such as accounting control, selection of unloading stations in response to changed requirements, indication of free capacity, etc.

The identification marking of the tray units 6,8 may, in a simple manner, be a purely physical marking of a binary code which is dynamically readable by the passage of the sensors 30, e.g. a plate strip 44 mounted edgewise at a side area of these units and shaped with a row of holes/no-holes for the marking of the codes. However, the invention is not limited to any particular arrangement in this respect.

As mentioned, it is an important possibility that the tray units 6,8 will not even need to be coupled together, as the single units or groups of units may be designed as separately movable elements that will just, of course, require a suitable driving system, e.g. consisting of a plurality of linear motors arranged evenly distributed all along the length of the conveyor. This can be an attractive possibility in very extensive systems, in which the capacity requirements do not justify the use of a continuous row of closely juxtaposed tray units. Quite long stretches may occur in which there are no unloading stations, and it will be possible, then, to permit the cart elements move with an increased speed along such free stretches, whereby the capacity of the system can be increased without using additional cart elements. It will still be possible to arrange one or more unloading stations along such stretches, inasfar as by the detection of the cart code it can at the same time be detected whether the cart moves sufficiently slowly to condition a safe tilting off, as the tilting or unloading will otherwise be annulled. Such an arrangement is advantageous because it will enable the use of the same destination code for two different unloading stations, which can then be selected by selectively controlling the speed of the carts moving past the respective stations.

Correspondingly it is possible to detect at each unloading station whether the carts move to slowly to safeguard a correct unloading. Also this can be used for control purposes, but moreover it will serve as a safety measure in case of a breakdown of the driving system, because this speed control will involve an extra security against unloadings being initiated without being terminated with any well defined result. If the velocity is not approximately correct, the articles may be unloaded in wrong places, and afterwards it can be a very heavy task to correct these sorting errors.

Nothing prevents that one or more unloading stations can be integrated with a loading station belonging to another sol-ting system, whereby the destination codes for the transferred articles may be passed to the sorter master of the next sorting system. Likewise, when separately moved cart elements are used, rail switches may be employed for bringing selected carts or series of carts to parallel sorter tracks or to associated sorters having their own control systems.

We claim:

1. A sorter system comprising a decentralized control system including a coding unit and loading master unit for defining a destination code for each of a plurality of article carrying trays or sections of a sorting conveyor; a sorter master unit for transferring the destination code to an unloading master unit which is a superior control unit for operation and check functions in receiving stations, such that the unloading operation in the receiving stations is actuated only by a locally detected arrival of a relevant designated article carrying tray or section; a superior sorter master unit, which controls and checks the loading of the articles onto respective, individually identified carrying trays or sections; and a coding master unit which controls and further conveys the coded destination code data for the articles, wherein the sorter master unit is additionally connected with a machine master unit and a system master unit, while the sorter master unit itself is subordinated to a managing master unit.

2. A sorter system according to claim 1, wherein said sorting conveyor is controlled so as to allow for a variable distance between the article carrying trays or sections.

* * * * *